Figure 1A:
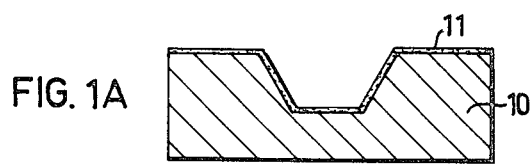

United States Patent [19]

Jansson

[11] 4,231,982
[45] Nov. 4, 1980

[54] METHOD FOR THE PRODUCTION OF TOOLS FOR DEEP DRAWING, MOULDING, EXTRUDING AND THE LIKE

[75] Inventor: Hans B. E. Jansson, Sölvesborg, Sweden

[73] Assignee: AB Volvo, Goteborg, Sweden

[21] Appl. No.: 579,278

[22] Filed: May 20, 1975

[51] Int. Cl.³ .................... B29C 1/02; B22C 7/00; B21K 5/20

[52] U.S. Cl. ................... 264/112; 76/107 R; 164/45; 164/46; 264/123; 264/225; 264/227; 264/338

[58] Field of Search .............. 264/225, 81, 220, 221, 264/226, 227, 309, 338, 111, 112, 121, 123; 164/45, 46; 76/107 R

[56] References Cited

U.S. PATENT DOCUMENTS

| | | | |
|---|---|---|---|
| 2,515,017 | 7/1950 | Nicholson | 264/227 |
| 3,228,650 | 1/1966 | Gilliland et al. | 264/225 |
| 3,343,430 | 9/1967 | Hoat et al. | 76/107 R |
| 3,405,212 | 10/1968 | Fraser et al. | 264/226 |
| 3,565,978 | 2/1971 | Folger et al. | 264/1 |

Primary Examiner—James B. Lowe
Attorney, Agent, or Firm—Young & Thompson

[57] ABSTRACT

An exact replica of a tool for deep drawing, moulding, extruding and the like is manufactured by a method according to the present invention by thermally spraying the wearing surface of the tool to be produced onto a negative replica of the tool to be produced, said last replica being constituted of an easily fusible metal with a lower melting point than the plastic material used for backing up (1) the easily fusible negative replica and (2) the thermally sprayed wearing surface of the tool. According to the method of the invention the wearing surface of the tool can be constituted of steel, carbide or oxide.

6 Claims, 6 Drawing Figures

METHOD FOR THE PRODUCTION OF TOOLS FOR DEEP DRAWING, MOULDING, EXTRUDING AND THE LIKE

Tools for deep drawing, moulding, extruding are in general made of steel which in various ways is worked, e.g. by planing, drilling, milling, grinding and polishing. This method of manufacture is rather expensive and time-consuming, particularly for large tools.

In order to provide for less expensive tool manufacture, for example for experiments, testing and for relatively short manufacturing runs, it has been known to employ thermally sprayed metal shells which are stiffened with various materials, e.g. non-shrinking cement or plastic with filling material. Metal especially has been thermally sprayed onto a model so that a metal shell, which is stiffened with cement, gypsum or plastic is obtained and is thereafter removed from the model. The most commonly employed metals have been zinc, tin, bronze and combinations thereof. Steel has also been employed.

The prior art tools suffer, however, from a number of shortcomings due to the fact that, in the case of steel, it has not been possible to spray a layer thicker than 0.2 mm, i.a. because the sprayed metal rises from the foundation or because the true-to-pattern shape is lost in some other way when one attempts to increase the thickness of the metal layer. It can be easily seen that the metal layer is of decisive significance for the longevity of the tool and if the material with which the shell is stiffened is not dimensionally stable, neither satisfactory accuracy to size nor satisfactory longevity are obtained.

Materials which are difficult to spray such as carbides or oxides and certain metallic alloys have not been successfully applied as smooth, true-to-pattern, sufficiently thick wearing surfaces in tools of the type disclosed herein. The thin wearing surfaces thus far produced have often required subsequent treatment in the form of grinding or polishing, for example.

These difficulties have been obviated, on the other hand, in manufacturing a tool according to the invention in that it has been possible to produce tools of a thermally sprayed, true-to-pattern wearing coating of metal, metal alloy, particularly steel, carbide or oxide, having a thickness of 2–5 mm and in intimate mechanical engagement with and stiffened by dimensionally stable, moulded, heat resistant plastic, optionally with added filling and reinforcing material.

To produce a tool according to the invention one begins with a positive or negative working model, for example of plastic, wood, wax or the like, wherein the model is provided with a release agent, is thermally sprayed with a thin layer of an easily fusible metal or metal alloy, to which true-to-pattern layer a wearing coating of another metal or metal alloy or another material is thermally sprayed, the method according to the invention being characterized in that a stiffener of heat resistant plastic is baked onto the easily fusible metal sprayed onto the working model; in that the working model is loosened from the easily fusible metal layer (spray model) which is stiffened with plastic, so that a bright and smooth impression of the working model is obtained; in that the plastic in the spray model is hardened or is so constituted that it withstands a temperature at least 20° C. higher than that required to fuse the easily fusible metal layer; in that the easily fusible metal impression (spray model) is coated by means of thermal spraying on its bright and smooth surface with the wearing coating of the intended tool; in that the tool backing is built up on the thermally sprayed wearing coating which backing consists of a plastic which withstands a temperature sufficiently high to fuse the easily fusible metal layer of the spray model; in that the plastic which comprises the tool backing is heated to the temperature at which the easily fusible metal fuses the the tool or tool member thus obtained and furnished with the wearing coating is separated from the spray model.

According to the invention the thermally sprayed wearing coating may consist of a metal, a metal alloy, particularly steel, carbide or oxide.

In one embodiment of the invention the plastic in the layer nearest the wearing coating of the tool is reinforced with silicon carbide, steel fiber, carbon fiber or similar material and in remaining parts with cheaper filling material, e.g. quartz.

The plastic which is advantageously used for the tool backing should be chosen so that it withstands a temperature which exceeds the fusing point of the easily fusible metal or metal alloy by at least 20° C.

The plastic which is used as stiffener for the wearing coating is a plastic which is thermosetting at room temperature and which undergoes final curing at increased temperature and/or has the property of withstanding the temperature required to fuse the easily fusible metal or metal alloy on the spray model.

Figure 1B:
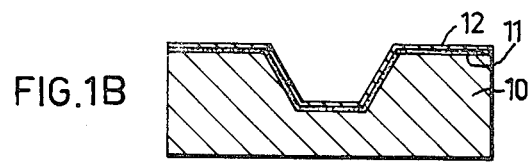
Figure 1C:
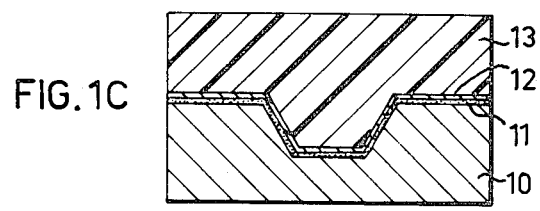
Figure 2A:
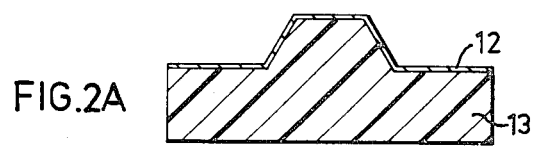
Figure 2B:
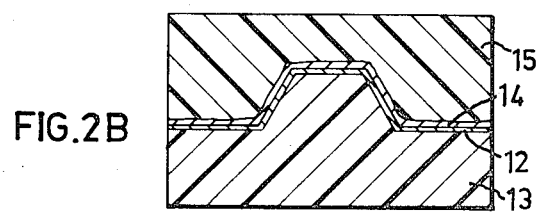
Figure 3:
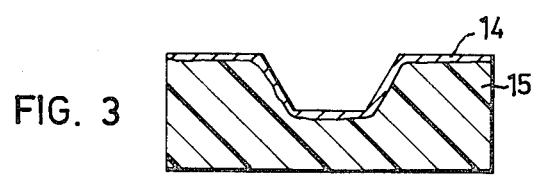

The invention will be described in greater detail in connection with the attached drawing in which FIGS. 1–3 represent various steps in the manufacturing of a tool from a working model according to FIG. 1A where FIG. 3 is an exact copy of the part in FIG. 1A.

The working model 10 shown in FIG. 1A is coated with a release coating 11. This working model is coated in FIG. 1B with a thermally sprayed layer 12 of an easily fusible metal or metal alloy. The upper surface of the sprayed layer as seen in the figure thereby becomes somewhat uneven while its under surface facing the working model 10 is smooth and is a copy of the surface of the working model. The thermally sprayed metal layer 12 is thereafter baked into a thermosetting plastic 13 (FIG. 1C) so that the adhesion between the plastic 13 and the sprayed easily fusible metal layer 12 is exceptionally strong as a result of the irregularity of the metal layer. It can thus be said that the plastic 13 engages the sprayed irregularities of the metal layer.

In FIG. 2A the working model 10 has been separated from the "spray model" 13 consisting of plastic baked onto the easily fusible metal layer. This separation has been possible because of the release agent 11 (FIG. 1A). The sprayed model according to FIG. 2A thus consists of hardened plastic 13 and a thermally sprayed metal layer 12, in intimate contact with the plastic 13 and showing a smooth and even surface corresponding to the original surface of the working model 10.

Onto this smooth surface of the easily fusible alloy is now sprayed a wearing coating 14 of metal, metal alloy, particularly steel, carbide or oxide, having a thickness of 2–5 mm (FIG. 2B). When thermally sprayed the wearing coating adheres in an outstanding manner to the micro pores of the easily fusible alloy layer 12 (FIG. 2B) and the wearing coating thereby receives the exact form which the original working model displayed. When the wearing coating 14 has reached sufficient thickness the thermal spraying is discontinued and thermosetting plastic 15 is baked onto the thermally sprayed wearing coating on its "spray side". An intimate adhesion is effected between the sprayed wearing coating and the plastic 15 applied thereto in this case as well. When the plastic 15 has cured the unit—the spray model 13 and the plastic 15—is heated to a temperature which exceeds the fusing point of the easily fusible alloy 12 by at least 20° C. The layer 12 thereupon fuses and the spray model may be separated from the finished tool or tool member 15 according to FIG. 3. A tool according to FIG. 3 is thereby obtained which is an exact copy of the working model according to FIG. 1A. The tool or tool member according to FIG. 3 may, of course, be mounted by conventional means in suitable carriers or fixtures for use.

The layer thicknesses shown in the drawing figures have, in some cases, been exaggerated for the sake of clarity.

One skilled in the art can, of course, appreciate that various modifications can be carried out without departing from the inventive conception as it is defined in the attached claims.

What I claim is:

1. A method for producing tools for deep drawing, moulding, extruding and the like, comprising forming a working model having a surface the shape of the tool to be produced, coating said surface with a release agent, thermally spraying on said coated surface a thin layer of an easily fusible metal or metal alloy, backing said sprayed layer with a stiffener of heat-resistant plastic, loosening the working model from the sprayed metal layer stiffened with plastic, thermally spraying on said easily fusible layer a wearing layer of the material of the intended tool, to a depth substantially thicker than the depth of said easily fusible layer, backing the wearing layer with a plastic that withstands a temperature sufficiently high to fuse said easily fusible layer, heating the assembly of easily fusible layer and wearing layer and plastic backings to a temperature sufficiently high to fuse said easily fusible layer, and separating the wearing layer and its plastic backing from the easily fusible layer and its plastic backing.

2. A method as claimed in claim 1, said wearing layer consisting of a member selected from the group consisting of a metal, metal alloy, carbide and oxide.

3. A method as claimed in claim 1, in which said wearing layer is steel.

4. A method as claimed in claim 1, and reinforcing said plastic in the layer of plastic nearest said wearing layer with a member selected from the group consisting of silicon carbide, steel fiber, and carbon fiber, and reinforcing the remaining portions of the plastic of the wearing layer backing with quartz.

5. A method as claimed in claim 1, in which both plastic backings resist a temperature at least 20° C. higher than the fusion point of the easily fusible layer.

6. A method as claimed in claim 1, in which the plastic that backs said wearing layer is thermosetting at room temperature.

* * * * *